(12) United States Patent
Yoon et al.

(10) Patent No.: US 9,645,406 B2
(45) Date of Patent: May 9, 2017

(54) POLARIZING CONTROL FILM AND STEREOSCOPIC DISPLAY DEVICE USING THE SAME

(71) Applicant: LG DISPLAY CO., LTD., Seoul (KR)

(72) Inventors: A-Ra Yoon, Seoul (KR); Hoon Kang, Goyang-si (KR); Young-Bok Lee, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 128 days.

(21) Appl. No.: 14/584,794

(22) Filed: Dec. 29, 2014

(65) Prior Publication Data

US 2016/0091727 A1 Mar. 31, 2016

(30) Foreign Application Priority Data

Sep. 30, 2014 (KR) ........................ 10-2014-0131948

(51) Int. Cl.
*G02F 1/1335* (2006.01)
*G02B 27/26* (2006.01)
*G02B 5/30* (2006.01)
*G02F 1/1343* (2006.01)
*G02F 1/1334* (2006.01)

(52) U.S. Cl.
CPC ........... *G02B 27/26* (2013.01); *G02B 5/3025* (2013.01); *G02F 1/1334* (2013.01); *G02F 1/134309* (2013.01); *G02F 2001/13347* (2013.01)

(58) Field of Classification Search
CPC ..... G02B 27/26; G02B 5/3025; G02F 1/1337; G02F 1/1334; G02F 1/134309

USPC .................................................... 349/15, 194
See application file for complete search history.

(56) References Cited

U.S. PATENT DOCUMENTS

| | | | | |
|---|---|---|---|---|
| 2005/0041196 | A1* | 2/2005 | Ishihara | C09K 19/02 349/181 |
| 2005/0185131 | A1* | 8/2005 | Miyachi | C09K 19/02 349/167 |
| 2007/0216841 | A1* | 9/2007 | Konno | G02F 1/134363 349/141 |
| 2008/0252720 | A1* | 10/2008 | Kim | H04N 13/0404 348/59 |
| 2010/0026920 | A1* | 2/2010 | Kim | H04N 13/0404 349/15 |
| 2012/0154697 | A1* | 6/2012 | Van Der Horst | G02B 27/225 349/15 |
| 2012/0257127 | A1* | 10/2012 | Miyazawa | G02F 1/13471 349/15 |

(Continued)

FOREIGN PATENT DOCUMENTS

JP 2004198958 A * 7/2004
KR 20130047649 * 5/2013

*Primary Examiner* — Hoan C Nguyen
(74) *Attorney, Agent, or Firm* — Birch, Stewart, Kolasch & Birch, LLP

(57) ABSTRACT

A polarizing control film for two-dimensional (2D) display mode/three-dimensional (3D) display mode conversion in a stereoscopic display device, can include a film substrate, a plurality of first and second electrodes alternately arranged on the film substrate, and a liquid crystal layer disposed on the film substrate having the first and second electrodes, the liquid crystal layer being filled with nano liquid crystals exhibiting optical isotropy when no voltages are applied to the first and second electrodes and optical anisotropy when voltages are applied to the first and second electrodes.

8 Claims, 7 Drawing Sheets

(56) References Cited

U.S. PATENT DOCUMENTS

| | | | |
|---|---|---|---|
| 2014/0055854 A1* | 2/2014 | Arakawa | G02B 27/26 359/462 |
| 2014/0184984 A1* | 7/2014 | Kim | G02F 1/134363 349/61 |
| 2015/0077668 A1* | 3/2015 | Wu | G02F 1/134309 349/15 |

* cited by examiner

Off

On

INITIAL ORIENTATION DIRECTION

POLARIZING CONTROL FILM AND STEREOSCOPIC DISPLAY DEVICE USING THE SAME

CROSS-REFERENCE TO RELATED APPLICATIONS

This application claims the benefit of Korean Patent Application No. 10-2014-0131948, filed in the Republic of Korea on Sep. 30, 2014, which is hereby incorporated by reference as if fully set forth herein.

BACKGROUND OF THE INVENTION

Field of the Invention

The present invention relates to a stereoscopic display device and, more particularly, to a polarizing control film for two-dimensional (2D) display mode/three-dimensional (3D) display mode conversion, the structure of which is simplified by changing an optical modulation means, and a stereoscopic display device using the same.

Discussion of the Related Art

Generally, a stereoscopic image, i.e. a 3D image, is obtained based on a stereo vision principle through two eyes. A left eye and a right eye view slightly different images due to the distance between the two eyes, which is about 65 mm. A difference between the images due to the distance between the two eyes is called binocular disparity. A 3D stereoscopic display device enables the left eye to view an image for the left eye and the right eye to view an image for the right eye using the binocular disparity.

That is, the left and right eyes view different 2D images. The two images are transmitted to the brain via the retina. The brain correctly merges the images to reproduce depth and reality of the 3D image. This ability is generally called stereography. A device adopting the stereography is a stereoscopic display device.

The stereoscopic display device may be classified as a glasses type device or a non-glasses type device.

In the glasses type stereoscopic display device, left and right images are spatially divided and displayed or left and right images are temporarily divided and displayed. In the glasses type device, however, a viewer must wear glasses to view a 3D image. For this reason, the non-glasses type stereoscopic display device is proposed as an alternative.

In the non-glasses type stereoscopic display device, an optical device, such as a parallax barrier or a lenticular lens, for separating optical axes of the left-eye and right-eye images is mounted at the front or rear of a display screen to realize a 3D image.

In the non-glasses type stereoscopic display device, however, a 3D image is displayed but conversion to a 2D image is not possible.

SUMMARY OF THE INVENTION

Accordingly, the present invention is directed to a polarizing control film and a stereoscopic display device using the same that substantially obviates one or more problems due to limitations and disadvantages of the related art.

An object of the present invention is to provide a polarizing control film for two-dimensional (2D) display mode/three-dimensional (3D) display mode conversion, the structure of which is simplified by changing an optical modulation means, and a stereoscopic display device using the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, the present invention can provide a polarizing control film including a film substrate, a plurality of first and second electrodes alternately arranged on the film substrate, and a liquid crystal layer disposed on the film substrate having the first and second electrodes, the liquid crystal layer being filled with nano liquid crystals exhibiting optical isotropy when no voltages are applied and optical anisotropy when voltages are applied. The nano liquid crystals are present in the liquid crystal layer in a state in which the nano liquid crystals are grouped into liquid crystal groups. The major axis of each of the liquid crystal group has a length less than 550 nm. In initial random arrangement without an orientation film, polarized light is not visible. The liquid crystal groups are laminated to the film substrate while being coupled to a binder.

In another embodiment of the present invention, there is provided a stereoscopic display device including a display panel for display an image, a polarizing control film for covering a plurality of first and second electrodes which are alternately arranged, the polarizing control film including a liquid crystal layer filled with nano liquid crystals exhibiting optical isotropy when no voltages are applied and optical anisotropy when voltages are applied, and a polarizing lens film disposed on the polarizing control film, the polarizing lens film including an optically anisotropic lens layer and an optically isotropic planarization layer having the same one-axis refractive index as the lens layer.

In the stereoscopic display device, the first and second electrodes of the polarizing control film may be formed on a film substrate. The film substrate may contact the display panel or the polarizing lens film. Alternatively, the first and second electrodes of the polarizing control film may be directly disposed on the surface of the polarizing lens film without the film substrate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Hereinafter, a polarizing control film of the present invention and a stereoscopic display device using the same will be described in detail with reference to the accompanying drawings.

Figure 1:
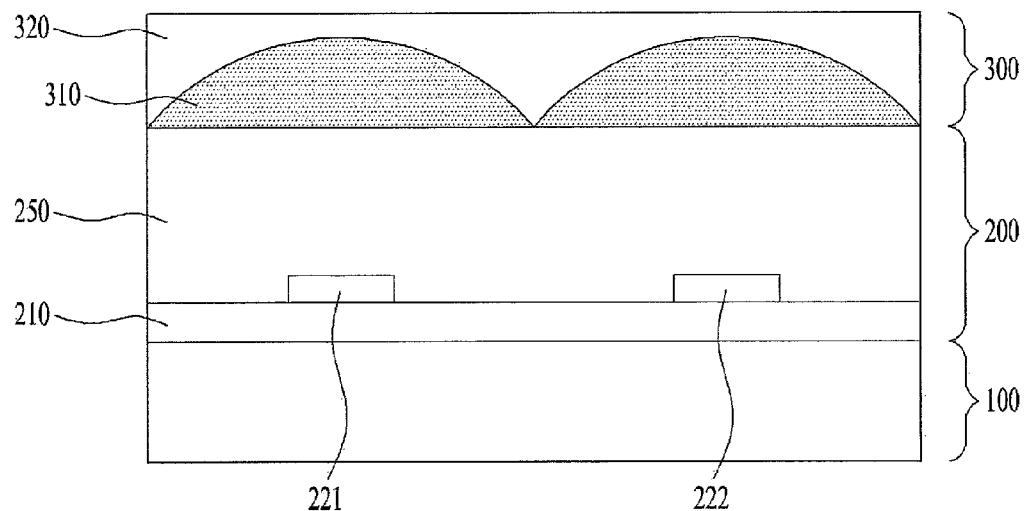
FIG. 1 is a sectional view schematically showing a stereoscopic display device according to an embodiment of the present invention.

FIG. 1 is a sectional view schematically showing a stereoscopic display device according to an embodiment of the present invention.

As shown in FIG. 1, the stereoscopic display device according to an embodiment of the present invention includes a display panel 100 for displaying an image, a polarizing control film 200 for covering a plurality of first and second electrodes 221 and 222 which are alternately arranged, the polarizing control film 200 including a liquid crystal layer 250 filled with nano liquid crystals, and a polarizing lens film 300 disposed on the polarizing control film 200, the polarizing lens film 300 including an optically anisotropic lens layer 310 and an optically isotropic planarization layer 320 having the same one-axis refractive index as the lens layer 310.

An adhesion layer may be provided between the display panel 100 and the polarizing control film 200 and between the polarizing control film 200 and the polarizing lens film 300.

The stereoscopic display device of the present invention is a non-glasses type display device. Specifically, the polarizing control film and the polarizing lens film are stacked on the display panel such that the display device selectively displays an image in a three-dimensional (3D) display mode and a two-dimensional (2D) display mode based on a switching operation therebetween instead of using polarizing glasses for dividing an image into a left-eye image and a right-eye image.

In the stereoscopic display device according to an embodiment of the present invention, the polarizing control film 200 and the polarizing lens film 300 are sequentially disposed on the display panel 100. An image is displayed in the 3D display mode and the 2D display mode based on an ON/OFF state of the polarizing control film 200. In the 3D display mode, light exits from the polarizing control film 200 such that an oscillating direction of the light is linearly polarized in a direction perpendicular to the oscillating direction of the light and is then incident upon the polarizing lens film 300. The polarizing lens film 300 refracts the incident light to divide the incident light into a left-eye image and a right-eye image. In the 2D display mode, on the other hand, the polarizing control film 200 functions as a kind of transparent film. Consequently, an image output from the display panel 100 passes through the polarizing lens film 300 in a state in which an oscillating direction of an incident light is not changed.

The display panel 100 selectively displays an image in the 2D display mode and the 3D display mode. In the 2D display mode, the display panel 100 displays a 2D image. In the 3D display mode, the display panel 100 alternatively displays a left-eye image and a right-eye image within one screen.

The display panel 100 may be a liquid crystal display panel, an organic light emitting display panel, a plasma display panel, a field emission display panel, or a quantum dot display panel. For the liquid crystal display panel, a light source, such as a backlight unit, is disposed under the liquid crystal display panel for transmitting light to the liquid crystal display panel. For the other display panels, on the other hand, a light emitting device is provided in each panel with the result that an additional light source may be omitted.

For example, in a situation in which the display panel 100 is a liquid crystal display panel, the display panel 100 may include first and second opposite substrates, a liquid crystal layer disposed between the first and second substrates, and first and second polarizing plates disposed at rears of the first and second substrates. An array including a thin film transistor for controlling operation per pixel and a color filter per pixel is provided on the first substrate or the second substrate facing the liquid crystal layer.

In a situation in which the display panel 100 is an organic light emitting display panel, on the other hand, a thin film transistor array including a thin film transistor per pixel is provided on a substrate, an organic light emitting diode having an organic film including first and second electrodes and a light emitting layer disposed therebetween is formed on the thin film transistor array, and a barrier for protecting the thin film transistor array and the organic light emitting diode and for preventing permeation of external moisture is provided. A polarizing plate for preventing vision of external light is located on the barrier.

In a situation in which the polarizing plate is provided at the uppermost surface of the display panel 100, the polarizing control film 200 is located on the polarizing plate. In a situation in which an optical film, such as the polarizing plate, is not provided, on the other hand, the polarizing control film 200 is located on the uppermost surface of the display panel 100. In addition, the polarizing lens film 300 is located on the polarizing control film 200.

Meanwhile, the polarizing lens film 300 includes the lens layer 310 and the planarization layer 320, which have different optical properties. The planarization layer 320 covers the lens layer 310, which is curved, such that the surface of the polarizing lens film 300 is planar. According to circumstances, vertical arrangement of the lens layer 310 and the planarization layer 320 may be changed. In addition, the lens layer 310 may be formed in a convex lens shape as shown in FIG. 1 or in a concave lens shape.

The lens layer 310 has a semi-cylindrical convex lens shape. The interior of the lens layer 310 is filled with a material, such as a mixture of liquid crystals and reactive mesogen, exhibiting optical anisotropy. The material filling the lens layer 310 is hardened by light, such as ultraviolet light. Consequently, the liquid crystals in the lens layer 310 are fixed in an initially arranged state. Otherwise, the liquid crystals may be oriented in a specific axial direction of the lens layer 310.

The material constituting the lens layer 310, which exhibits optical anisotropy, has a different major-axis refractive index $n_e$ and minor-axis refractive index $n_o$. The planarization layer 320 is formed of a material exhibiting optical anisotropy and having the same refractive index as the major-axis refractive index $n_e$ and the minor-axis refractive index $n_o$ of the lens layer 310. When light incident upon the polarizing lens film 300 oscillates in an axial direction in which the lens layer 310 and the planarization layer 320 have different refractive indices, therefore, the light is refracted at the interface between the lens layer 310 and the planarization layer 320 due to a refractive index difference between the lens layer 310 and the planarization layer 320 while passing through the polarizing lens film 300 and then exits. In this situation, a stereoscopic image may be displayed due to a light refraction effect. In a situation in which the light incident upon the polarizing lens film 300 oscillates in an axial direction in which the lens layer 310 and the planarization layer 320 have the same refractive index, on the other hand, the incident light exits according to oscillation of the incident light without a refractive index difference at the interface between the lens layer 310 and the planarization layer 320.

That is, polarization of light exiting from polarizing lens film 300 is decided depending upon whether there is a refractive index difference at the interface of the polarizing lens film 300 during oscillation of the light in a specific axial direction. This is decided depending upon whether the oscillation of light exiting from the polarizing control film 200 is linearly polarized in a direction different from the direction of the light exiting from the display panel 100.

Hereinafter, the structure and operation of the polarizing control film 200 in embodiments of the present invention will be described in detail with reference to the accompanying drawings.

Figure 2:
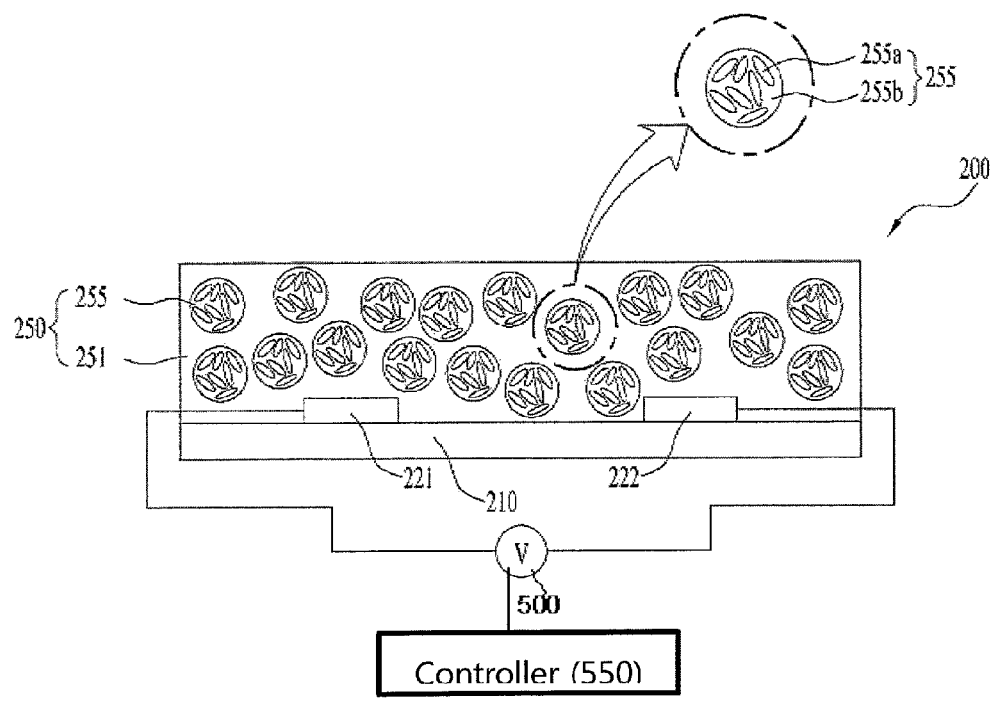
FIG. 2 is a sectional view showing a polarizing control film according to a first embodiment of the present invention.
Figure 3:
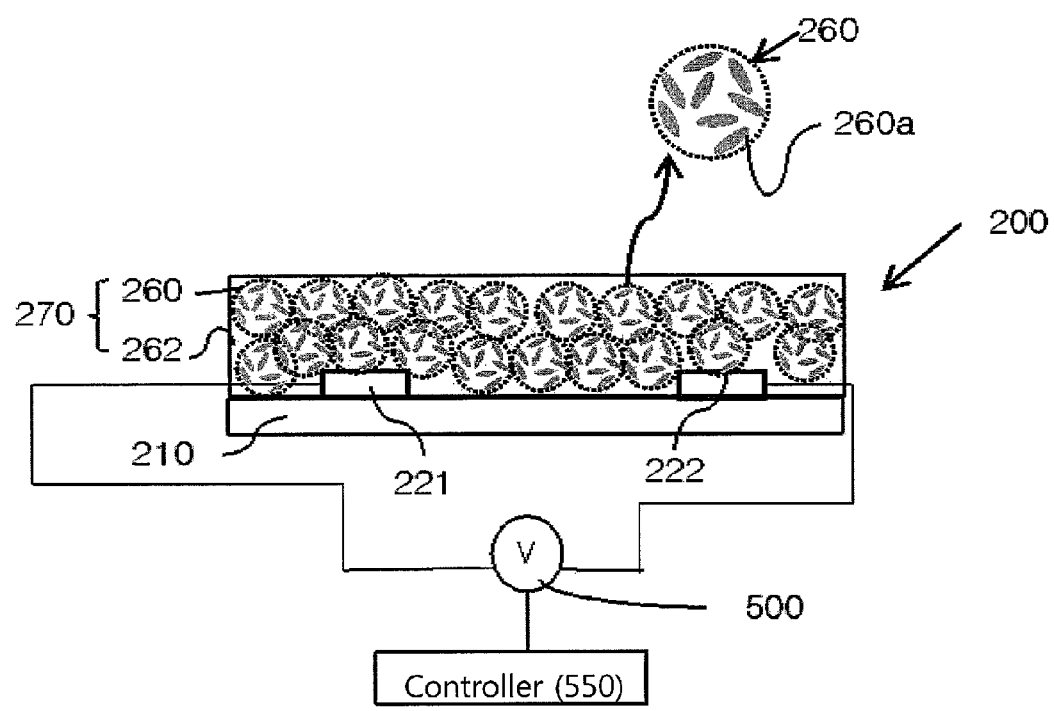
FIG. 3 is a sectional view showing a polarizing control film according to a second embodiment of the present invention.

FIG. 2 is a sectional view showing a polarizing control film according to a first embodiment of the present invention and FIG. 3 is a sectional view showing a polarizing control film according to a second embodiment of the present invention.

Figure 4A:
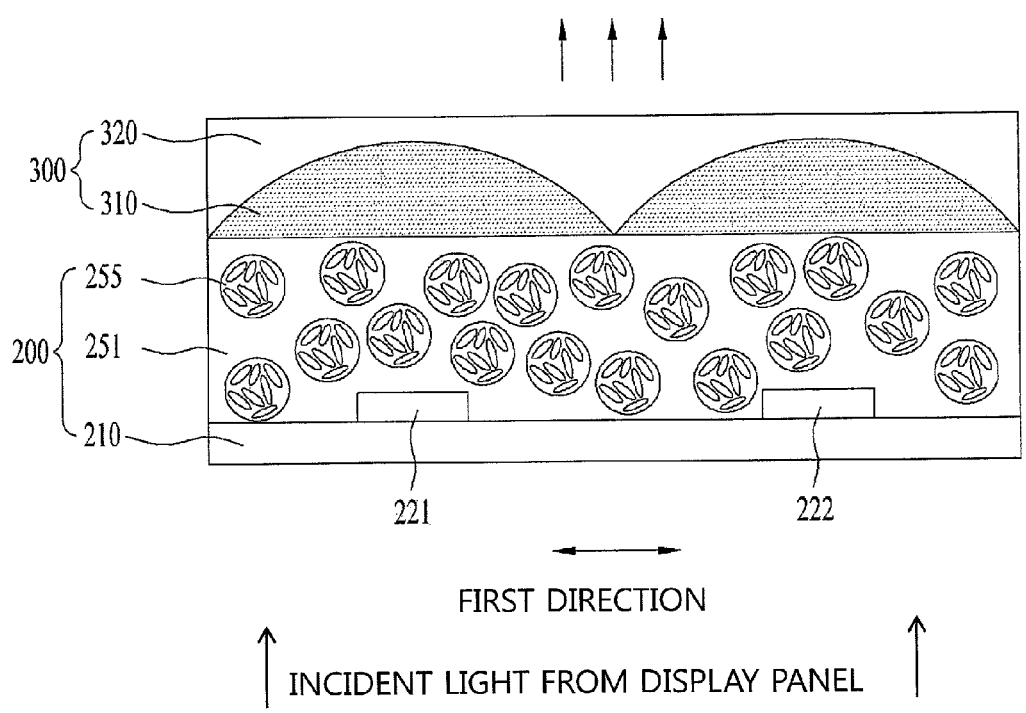
FIGS. 4A and 4B are sectional views showing operation principles of the stereoscopic display device according to an embodiment of the present invention in a two-dimensional (2D) display mode and a three-dimensional (3D) display mode, respectively.
Figure 4B:
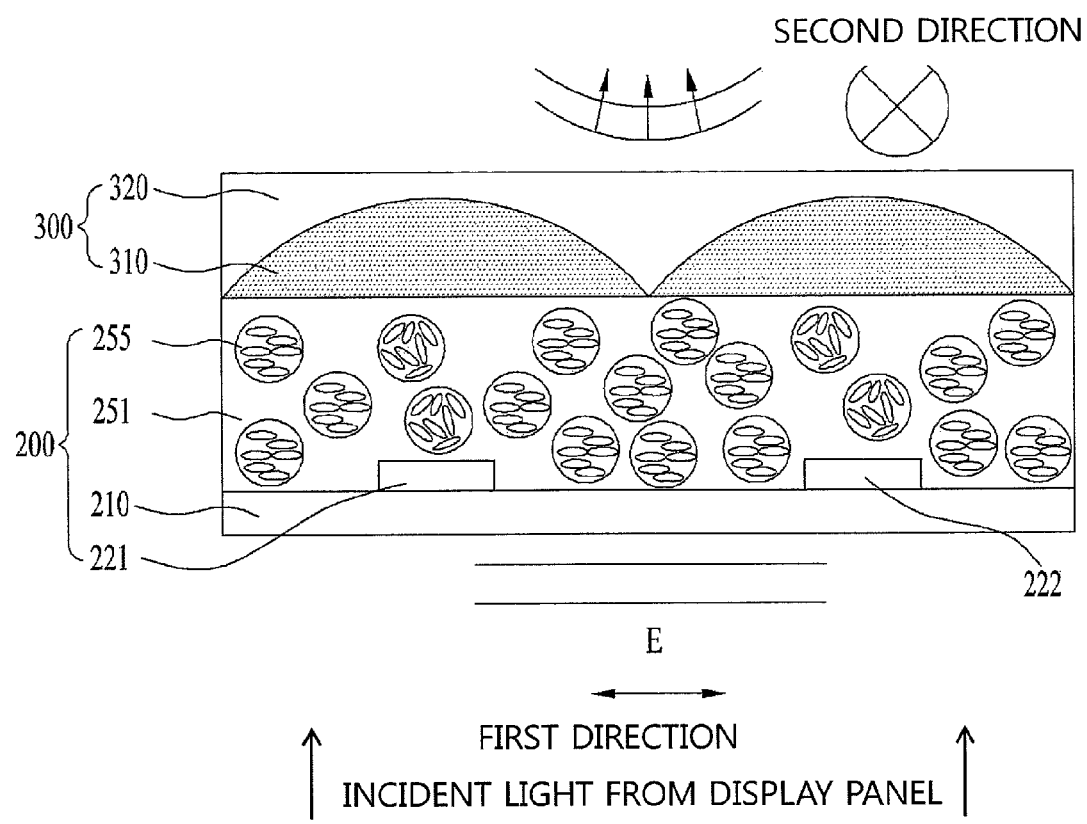
Figure 5A:
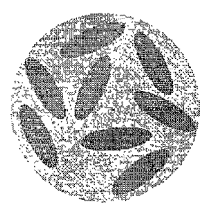
FIGS. 5A and 5B are sectional views showing the arrangement of nano liquid crystals based on whether or not voltages are applied according to an embodiment of the present invention.
Figure 5B:
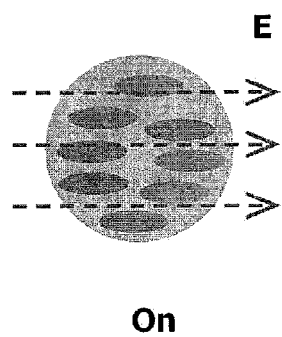

FIGS. 4A and 4B are sectional views showing operation principles of the stereoscopic display device of embodiments of the present invention in the 2D display mode and the 3D display mode, respectively, and FIGS. 5A and 5B are sectional views showing arrangement of nano liquid crystals based on whether or not voltages are applied.

First Embodiment

As shown in FIG. 2, the polarizing control film 200 according to the first embodiment of the present invention is formed by forming first and second electrodes 221 and 222 on a thin film substrate 210 exhibiting ductility, which is different from a hard material, such as a glass substrate, in parallel using a printing method and attaching a liquid crystal layer 250 having a plurality of capsules 255 dispersed in a binder 251 to tops thereof using a lamination method.

The film substrate 210 may be formed of a thin transparent plastic material. For example, the film substrate 210 may be formed of a polyethylene terephthalate (PET), triacetyl cellulose (TAC), or polycarbonate (PC).

Each capsule 255 includes a plurality of nano liquid crystals 255a and a mobile polymer 255b. In addition, each capsule 255 has a shell exhibiting higher hardness than the polymer 255b such that the capsules 255 are separated from one another.

The liquid crystal layer 250 can be manufactured as follows. Monomers, capsules 255, a dispersant, a surfactant, and a photoinitiator are put in a solvent to prepare a mixture. The mixture is applied to the film substrate 210 having the first and second electrodes 221 and 222 in a liquid state and is then hardened using an ultraviolet hardening method. Polymerization of the monomers is accelerated to form a binder 251. The capsules 255 are disposed in the binder 251. In this situation, a liquid composite material for forming the liquid crystal layer is applied to the film substrate 210 and is then hardened such that the liquid crystal layer 250 is chemically coupled to the film substrate 210. Consequently, it is not necessary to provide an additional adhesion layer at the interface and the liquid crystal layer 250 can be formed in a thin film shape. The liquid composite material for forming the liquid crystal layer exhibits viscosity. Consequently, the liquid composite material does not run down the film substrate 210 and may be solidified by polymerization within a short time during ultraviolet hardening.

During polymerization of the monomers, no heat is applied to the nano liquid crystals 255a in the capsules 255 of the liquid crystal layer 250 formed by using the above manufacturing method. Although heat is applied to the nano liquid crystals 255a, the nano liquid crystals 255a have a temperature less than a phase change temperature. Consequently, the nano liquid crystals 255a may be movable in each capsule 255 based on whether or not voltages are applied.

In addition, the diameter of each capsule 255 is less than a wavelength of visible light. When no voltages are applied to the first and second electrodes 221 and 222, the nano liquid crystals 255a are randomly arranged, therefore, light incident from below exits without a refractive index difference and thus without delay or refraction. That is, the size of each capsule 255 may be less than the average wavelength, 550 nm, of the visible light. According to circumstances, the size of each capsule 255 may be less than the minimum wavelength, 380 nm, of the visible light. The diameter of the major axis of each nano liquid crystal 255a may be equal to or less than that of each capsule 255.

Meanwhile, a general liquid crystal panel is configured to have a structure in which an additional substrate opposite to a substrate including electrodes is further provided, a liquid crystal is disposed between the substrates, and the edges of the substrates between the substrates are encapsulated by an encapsulation member. Unlike the general liquid crystal panel in the related art, the liquid crystal layer 250 of the present invention, including the capsules 255 and the binder 251, which are hardened, can be attached to the film substrate 210, which has the first and second electrodes 221 and 222 printed thereon, in a film shape by lamination.

Consequently, the additional substrate and the encapsulation member may be omitted. In addition, the capsules 255 exhibit initial optical isotropy and, therefore, it is not necessary to orient the capsules 255. Thus, no orientation film is required.

The liquid crystal layer 250 of the present invention can be formed by laminating a liquid material containing capsules 255, a binder 251, a photoinitiator, and a dispersant to the film substrate 210 and hardening the liquid material using an ultraviolet hardening method. As needed, a solvent may be contained in the liquid material. The solvent is violated during hardening. The quantity of the photoinitiator or the dispersant in the liquid material can be about 1% of the ingredients of the liquid material. That is, the quantity of the photoinitiator or the dispersant in the finished liquid crystal layer 250 is insignificant. The main ingredients of the liquid crystal layer 250 are the capsules 255 and the hardened binder 251. The capsules 255 and the hardened binder 251 of the hardened liquid crystal layer 250 are in direct contact with the film substrate 210.

The first and second electrodes 221 and 222 are parallel to each other and extend in one direction. According to circumstances, the first and second electrodes 221 and 222 may be formed in an inclined shape having an acute angle with respect to a short-side direction of the film substrate 210. The inclined shape is considered because a transmission axis of the uppermost polarizing plate of the lower display panel is not parallel or perpendicular to the short side of the film substrate but is inclined at an acute angle. In a situation in which the lower display panel is not provided with a polarizing plate having a specific transmission axis, the first and second electrodes 221 and 222 may be parallel or perpendicular to the short side of the film substrate.

The first and second electrodes 221 and 222 are connected to a voltage source 500 capable of applying different voltages such that a transverse electric field is generated between the first and second electrodes 221 and 222. For switching between the 2D display mode and the 3D display mode, the voltage source 500 is connected to a controller 550.

Meanwhile, the first and second electrodes 221 and 222 on the film substrate 210 are formed of a metal or an organic material exhibiting conductivity. For example, the first and second electrodes 221 and 222 may be formed of a light shielding metal, such as copper (Cu), silver (Ag), gold (Au), aluminum (Al), chrome (Cr), or a compound thereof. Alternatively, the first and second electrodes 221 and 222 may be formed of an organic material exhibiting conductivity, such as a carbon nano tube (CNT) or graphene. Otherwise, transparent electrodes may be used.

In addition, the first and second electrodes 221 and 222 can be formed using a metal printing method. This is because it is difficult to form a metal on the film substrate 210, which exhibits higher ductility and lower heat resistance than the glass substrate used with a general sputtering method.

However, the method of forming the first and second electrodes 221 and 222 is not limited to the printing method. As needed, the first and second electrodes 221 and 222 may be formed by sputtering. Other methods may be used so long as the process is not particularly limited.

In a first example of the metal printing method, a film substrate is mounted on a stage, a metal material is formed on the entire surface of the film substrate, a silicone blanket having a specific protruding pattern formed on the surface thereof is rolled on the film substrate such that the specific protruding pattern is transferred to the film substrate, and the metal material is partially exposed according to the protruding pattern to form first and second electrodes.

In a second example of the metal printing method, a mold having specific concave and convex parts is prepared, the mold is bonded to a film substrate having a pattern defining material formed at the surface thereof such that a pattern defining layer corresponding to the concave parts of the mold is formed on the film substrate, a region of the film substrate excluding the pattern defining layer is filled with liquid metal ink, and the liquid metal ink is hardened to form first and second electrodes. In this situation, the pattern defining layer may be removed after the first and second electrodes are formed.

The method of forming the first and second electrodes 221 and 222 is not limited to the above examples. The first and second electrodes 221 and 222 may be formed using various other methods so long as the film substrate is not damaged.

Meanwhile, the first and second electrodes 221 and 222 have a width of 0.1 to 10 μm. The width of the first and second electrodes 221 and 222 may be changed so long as a pattern is not cut while an opening rate is not lowered.

In addition, an adhesion layer may be further provided between the liquid crystal layer 250 and the polarizing lens film 300 or the surface of the liquid crystal layer 250 may be in direct contact with the polarizing lens film 300. More specifically, the binder 251 and the capsules 255 constituting the liquid crystal layer 250 may be in contact with one surface of the polarizing lens film 300 or the adhesion layer.

When no voltages are applied to the first and second electrodes 221 and 222, the nano liquid crystals 255a in each capsule 255 are randomly arranged as shown in FIG. 5A. On the other hand, when voltages are applied to the first and second electrodes 221 and 222, the nano liquid crystals 255a in each capsule 255 are transversely arranged as shown in FIG. 5B. That is, the nano liquid crystals 255a in each capsule 255 may be movable based on whether or not voltages are applied to the first and second electrodes 221 and 222.

Meanwhile, the size of the nano liquid crystals 255a is very small. when light passes through the liquid crystal layer 250 filled with the capsules 255 containing the nano liquid crystals 255a and the binder 251, as shown in FIG. 4A, in a state in which no voltages are applied, the nano liquid crystals 255a are randomly arranged, the light passes through the liquid crystal layer 250 in the same state as in the light having passed through the display panel 100 without polarization. In this situation, the liquid crystal layer 250 exhibits optical isotropy. That is, linearly polarized light in the lower display panel 110 oscillating in a first direction exits from the polarizing control film 200 without polarization. In the polarizing lens film 300, the light oscillating in the first direction has no refractive index difference between corresponding axes of the lens layer 310 and the planarization layer 320. Finally, the light oscillating in the first direction exits from the polarizing lens film 300 without changing, in order to display a 2D image. That is, in the 2D display mode, a 2D image exiting from the display panel 100 passes through the polarizing control film 200 and the polarizing lens film 300 without changing.

In addition, as shown in FIGS. 4B and 5B, each nano liquid crystal 255a has a positive refractive index. When voltages are applied in the 3D display mode, the nano liquid crystals 255a are arranged along an electric field. When voltages are applied to the liquid crystal layer 250, different voltages are applied to the first and second electrodes 221 and 222, which are arranged in parallel, with the result being that a transverse electric field is generated between the first and second electrodes 221 and 222. Consequently, the nano liquid crystals 255a are arranged along the transverse electric field. As a result, double refraction is generated. Consequently, the light oscillating in the first direction is polarized in a second direction perpendicular to the first direction. Finally, the light linearly polarized from the incident light by 90 degrees exits from the polarizing lens film 300.

That is, in the 3D display mode, a left-eye image and a right-eye image exiting from the display panel 100 are polarized into light linearly polarized by 90 degrees according to a switching operation of the polarizing control film 200. The linearly polarized light exits from the polarizing control film 200. In the polarizing lens film 300, the linearly polarized light is refracted at the interface between the lens layer 310 and the planarization layer 320 due to a refractive index difference between the lens layer 310 and the planarization layer 320. The light converges to the left eye and the right eye of a viewer. Consequently, the left-eye image and the right-eye image are separately viewed by the viewer with the result that the viewer recognizes a stereoscopic image. In this situation, the lens layer 310 has a major-axis refractive index $n_e$ in a longitudinal direction (a direction passing through the paper in the drawing), the lens layer 310 has a shape in which semi-cylindrical lenses are arranged in parallel in a first direction, and a minor-axis refractive index $n_o$ in the first direction, which intersects the longitudinal direction. The planarization layer 320 is formed of a material exhibiting optical anisotropy and having the same refractive index as the major-axis refractive index $n_e$ of the lens layer 310.

When the polarizing control film 200 is switched on, light incident upon the polarizing lens film 300 in a linearly polarized state and oscillating in the longitudinal direction of the lens layer 310 is refracted at the interface between the lens layer 310 and the planarization layer 320 due to a refractive index difference between the lens layer 310 and the planarization layer 320. When the polarizing control film 200 is switched off, on the other hand, the light oscillating in the direction perpendicular to the longitudinal direction is not refracted at the interface between the lens layer 310 and the planarization layer 320 because there is no refractive index difference between the lens layer 310 and the planarization layer 320. In this way, it is possible to selectively display a 2D image and a 3D image.

Second Embodiment

FIG. 3 is a sectional view showing a polarizing control film according to a second embodiment of the present invention.

As shown in FIG. 3, in the polarizing control film according to the second embodiment of the present invention, the first and second electrodes 221 and 222 are formed on the film substrate 210 in the same manner as in the first embodiment.

The second embodiment is different from the first embodiment in that a plurality of nano liquid crystals is grouped into liquid crystal groups 260, which are packed to constitute a liquid crystal layer 270.

In this situation, nano liquid crystals 260a and a binder 262 in the liquid crystal layer 270 may be in direct contact with the film substrate 210.

Even in this situation, the nano liquid crystals 260a in each liquid crystal group 260 are randomly arranged when voltages are applied to the first and second electrodes 221 and 222 and transversely arranged when no voltages are applied to the first and second electrodes 221 and 222.

That is, the liquid crystal layer 270 is different in construction from the liquid crystal layer 250 of the first embodiment. However, switching on/off operation of the liquid crystal layer 270 based on whether or not voltages are applied is the same as that of the liquid crystal layer 250 of the first embodiment.

The liquid crystal layer 270 is formed by coating the film substrate 210 having the first and second electrodes 221 and 222 with a liquid material containing nano liquid crystals, monomers, a photoinitiator, and a dispersant, applying ultraviolet light to the liquid material for phase separation such that the nano liquid crystals are grouped into movable spherical liquid crystal groups 260. During formation of the liquid crystal layer 270, the monomers are coupled to each other by polymerization to constitute a binder. The binder is hardened in a state in which the spherical liquid crystal groups are confined in the binder.

In this situation, the liquid crystal groups 260 do not have the same shape. During phase separation, the liquid crystal groups 260 may have different numbers of nano liquid crystals or different shapes.

In the first and second embodiments, the binder is hardened in a state in which the capsules in the liquid crystal layer or the liquid crystal groups 260 having nano liquid crystals are confined in the binder which has viscosity and can be polymerized. Consequently, it is possible to attach the liquid crystal layer 270 to the film substrate 210 in a thin film shape without an additional structure for encapsulating the liquid crystals.

In the same manner as in the capsules of the first embodiment, each liquid crystal group 260 contains nano liquid crystals. When no voltages are applied, the nano liquid crystals are randomly arranged. When voltages are applied, the nano liquid crystals are arranged along the transverse electric field between the first and second electrodes. The diameter of each nano liquid crystal may be less than 550 nm. According to circumstances, the diameter of each nano liquid crystal may be less than the minimum wavelength, 380 nm, of the visible light.

That is, each nano liquid crystal contained in each liquid crystal group 260 of an embodiment of the present invention is a small liquid crystal, the length of the major axis of which is less than 550 nm, unlike a liquid crystal contained in a general liquid crystal panel. When no voltages are applied to the first and second electrodes 221 and 222, the nano liquid crystals are randomly arranged. Consequently, light incident from the lower display panel 100 exits from the liquid crystal layer 270 in a state in which an oscillating direction of the light is not changed.

When voltages are applied to the first and second electrodes 221 and 222, the nano liquid crystals are arranged in a transverse direction perpendicular to a longitudinal direction of the first and second electrodes (a direction passing through the paper). As a result, the light passing through the liquid crystal layer 270 is double refracted. Consequently, the light vibrating in the first direction is polarized in a second direction perpendicular to the first direction. The light linearly polarized from the incident light by 90 degrees exits from the liquid crystal layer 270. In the polarizing lens film 300, the linearly polarized light is refracted at the interface between the lens layer 310 and the planarization layer 320 due to a refractive index difference between the lens layer 310 and the planarization layer 320 in the second direction. The final image is divided into a left-eye image and a right-eye image, which are separately recognized by the viewer. Consequently, a stereoscopic image is visible.

Third Embodiment

Figure 6:
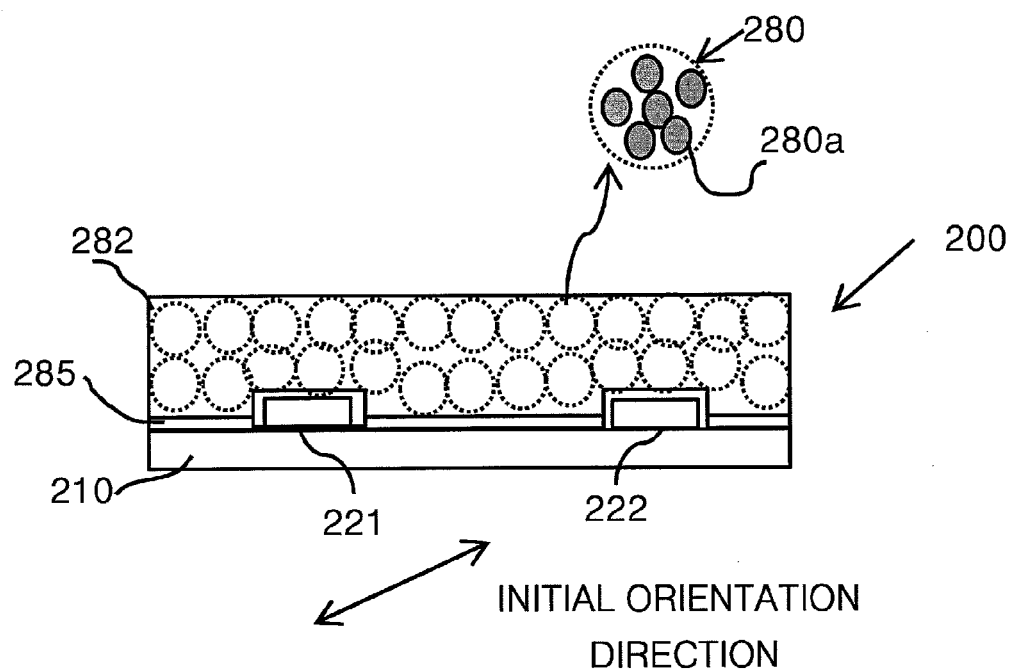
FIG. 6 is a sectional view showing a polarizing control film according to a third embodiment of the present invention.

FIG. 6 is a sectional view showing a polarizing control film according to a third embodiment of the present invention.

As shown in FIG. 6, the polarizing control film 200 according to the third embodiment of the present invention includes a film substrate 210, a plurality of first and second electrodes 221 and 222 alternately arranged on the film substrate 210, and a liquid crystal layer disposed on the film substrate 210 including the first and second electrodes 221 and 222, the liquid crystal layer including liquid crystal groups 280, the diameter of the major axis of which is less than 550 nm, coupled with a binder 282.

The third embodiment is identical to the first and second embodiments in that the liquid crystal layer includes the liquid crystal groups 280 and is formed on the film substrate 210 including the first and second electrodes 221 and 222 by lamination but is different from the first and second embodiments in that an orientation film 285 is provided on the film substrate 210 including the first and second electrodes 221 and 222 for inducing a specific initial orientation when no voltages are applied.

In this situation, an initial direction of the orientation film 285 is different from a direction in which liquid crystals 280a in each liquid crystal group 280 are arranged due to a transverse electric field generated when different voltages are applied to the first and second electrodes 221 and 222. For example, as shown in FIG. 6, the initial orientation is inclined at an acute angle with respect to a longitudinal direction of the first and second electrodes 221 and 222; however, the present invention is not limited thereto. The orientation direction of the orientation film 285 may be differently defined so long as the liquid crystals 280a in each liquid crystal group 280 are differently arranged when voltages are applied.

Figure 7:
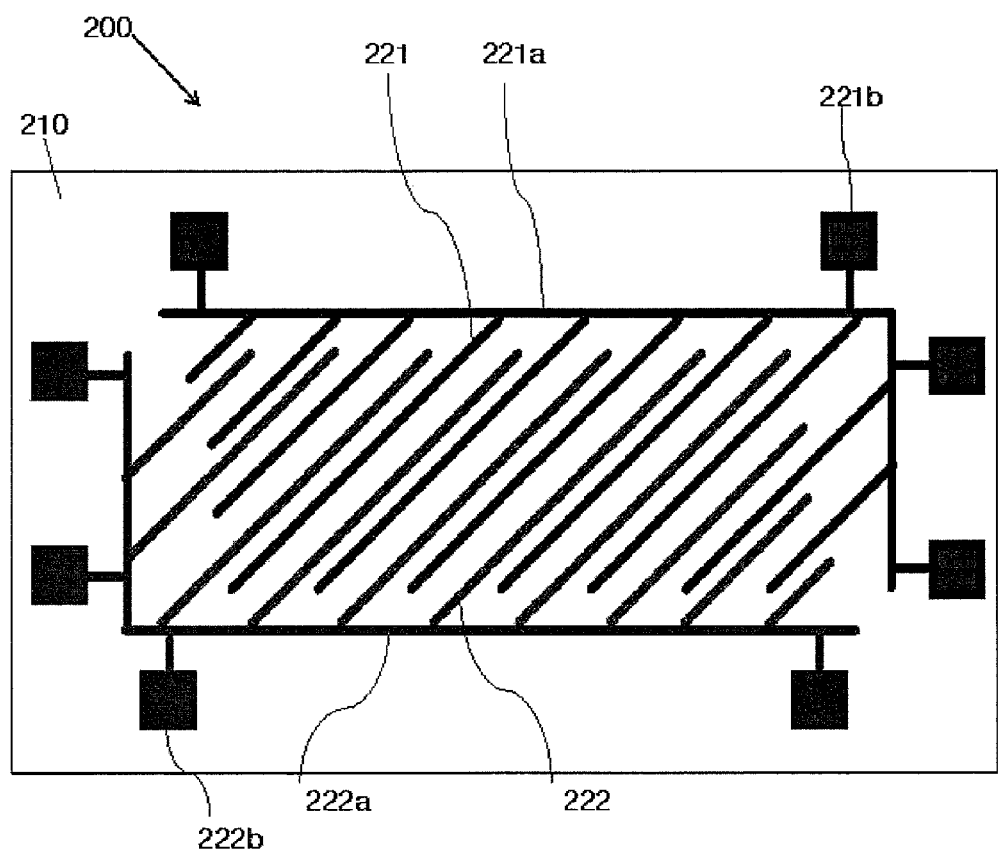
FIG. 7 is a plan view of the polarizing control film according to an embodiment of the present invention when viewed from above.

FIG. 7 is a plan view showing an example of the polarizing control film according to an embodiment of the present invention when viewed from above.

As shown in FIG. 7, in the polarizing control film 200 according to an embodiment of the present invention, the first and second electrodes 221 and 222 may be arranged in parallel on the film substrate 210 in a state in which the first and second electrodes 221 and 222 are inclined at an acute angle with respect to a short side direction of the film substrate 210. The arrangement of the first and second electrodes 221 and 222 is considered because a polarizing axis of the uppermost polarizing plate of the lower display panel 100 is inclined at an acute angle with respect to a short side of the board of the display panel 100. In a situation in which the lower display panel is not provided with a polarizing plate or the polarizing plate has a different polarizing axis direction, the longitudinal direction of the first and second electrodes 221 and 222 may be parallel or perpendicular to the short side of the film substrate 100 or the inclined angle of the first and second electrodes 221 and 222 may be adjusted. In addition, the arrangement of the first and second electrodes 221 and 222 is not limited to the above example. The first and second electrodes 221 and 222 may be arranged in a zigzag shape in a state in which the first and second electrodes 221 and 222 are in parallel.

In addition, different voltages can be applied to the first and second electrodes 221 and 222. To this end, a first connection wire 221a for interconnecting the first electrodes 221, to which the same voltages are applied, and a second connection wire 222a for interconnecting the second electrodes 222 are provided at the outside of the first and second electrodes 221 and 222. The first connection wire 221a and the second connection wire 222a are connected to different pad electrodes 221b and 222b, respectively. The pad electrodes 221b and 222b are connected to the voltage source 500 (see FIGS. 2 and 3) for receiving voltage signals.

Meanwhile, the voltage difference between the first and second electrodes may be changed based on a distance between the first and second electrodes, the width of each of the first and second electrodes, Δn of the nano liquid crystals when voltages are applied, and the thickness of the liquid crystal layer. However, the present invention is not limited to the above conditions.

Hereinafter, other embodiments of the stereoscopic display device of the present invention will be described.

Figure 8:
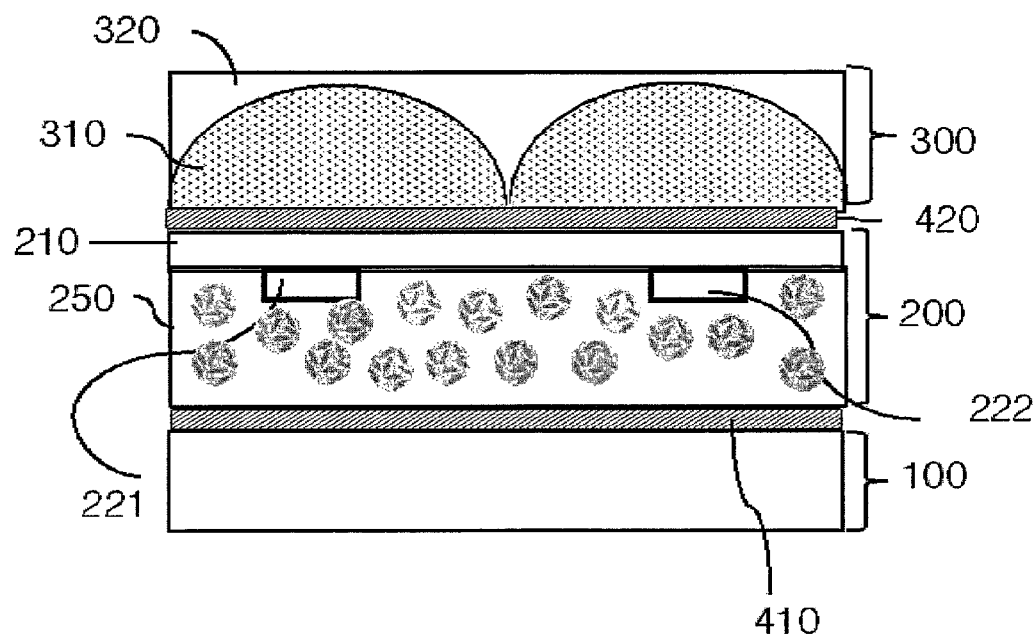
FIG. 8 is a sectional view showing a stereoscopic display device according to another embodiment of the present invention.

FIG. 8 is a sectional view showing a stereoscopic display device according to another embodiment of the present invention.

The stereoscopic display device of FIG. 8 is identical in construction to the stereoscopic display device of FIG. 1 except that the polarizing control film 200 of FIG. 1 is reversed such that the film substrate 210 is adjacent to the polarizing lens film 300.

That is, the vertical relationship between the film substrate 210 and the liquid crystal layer 250 does not affect the optical properties of the stereoscopic display device according to embodiments of the present invention.

As shown in FIG. 8, a first adhesion layer 410 and a second adhesion layer 420 are disposed at opposite surfaces of the polarizing control film 200. The adhesion layer 410 is attached to the liquid crystal layer 250 and the display panel 100. The second adhesion layer 420 is attached to the film substrate 210 and the polarizing lens film 300.

In this situation, the liquid crystal layer 250 is attached to the lower display panel 100 via the first adhesion layer 410. Consequently, the binder 251 and the capsules 255 constituting the liquid crystal layer 250 are in direct contact with the first adhesion layer 410. The surface of the film substrate 210 on which the first and second electrodes are not printed is in contact with the second adhesion layer 420.

In addition, the liquid crystal layer 250 of the polarizing control film 200 of the stereoscopic display device of FIG. 8 is the same as that of the polarizing control film of the first embodiment as shown in FIG. 2; however, the present invention is not limited thereto. In the same manner as in the second embodiment, liquid crystal groups may be packed to constitute the liquid crystal layer.

In the stereoscopic display device of the present invention, the polarizing control film 200, which controls polarization, may be configured as in the first and second embodiments; however, the present invention is not limited thereto. For example, a liquid material for controlling a refractive index may be applied to the film substrate using a roll-to-roll method in a film shape and then hardened to form a solid thin film layer for adjusting the refractive index. In this situation, the refractive index of the solid thin film layer for adjusting the refractive index is changed based on whether or not voltages are applied. When no voltages are applied, the solid thin film layer for adjusting the refractive index has optical isotropy. When voltages are applied, on the other hand, the solid thin film layer for adjusting the refractive index functions to guide exiting light in an oscillating direction of the light intersecting an oscillating direction of incident light.

The liquid crystal layer 250 includes a plurality of liquid crystal groups having nano liquid crystals and a binder. In the same manner as in a capsule, each liquid crystal group (liquid crystal aggregate) may have a shell, by which the liquid crystal groups are separated from one another. Alternatively, the nano liquid crystals may aggregate due to coupling between the nano liquid crystals based on phase separation without an additional shell or polymer material.

Figure 9:
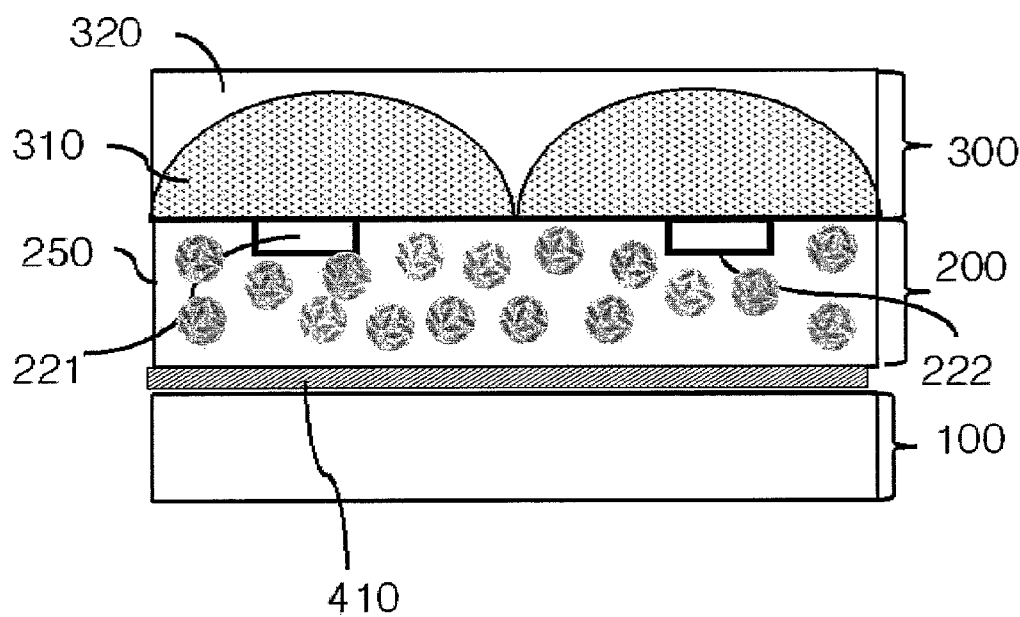
FIG. 9 is a sectional view showing a stereoscopic display device according to a further embodiment of the present invention.

FIG. 9 is a sectional view showing a stereoscopic display device according to a further embodiment of the present invention.

In this embodiment, a polarizing lens film 300 is prepared and then first and second electrodes 221 and 222 are directly formed at one surface of the polarizing lens film 300. In this embodiment, a film substrate is omitted from a polarizing control film.

The first and second electrodes 221 and 222 may be formed of copper, silver, gold, aluminum, chrome, or a compound thereof using a printing method. It is possible to minutely adjust the width and pitch of the first and second electrodes 221 and 222. In addition, heat resistance and impact resistance as in a sputtering process are not required. Consequently, the polarizing lens film 300 does not require a hardness corresponding to a glass substrate. In the printing process, it is possible to form a pattern even in a situation in which the hardness of the polarizing lens film 300 corresponds to that of a general plastic film.

In this situation, the liquid crystal layer 250 is formed by containing nano liquid crystals in capsules together with polymers and putting the capsules in a binder as in the example of FIG. 8. Alternatively, as in the second embodiment of the polarizing control film, a plurality of liquid crystal groups having liquid crystals is packed and coupled to one another in a binder to form the liquid crystal layer 250. In this situation, the nano liquid crystals and the binder in the capsules or liquid crystal groups of the liquid crystal layer 250 are in contact with one surface of the polarizing lens film 300.

In the above embodiments, the polarizing control film 200 is driven for 2D display when no voltages are applied and for 3D display when voltages are applied. As needed, however, a polarizing axis of the polarizing plate of the display panel outside the polarizing control film or a refractive index anisotropy between the layers of the polarizing lens film may be changed such that the display state when voltages are applied and the display state when no voltages are applied are reversed, i.e. an image is displayed in a 2D display mode when voltages are applied and in a 3D display mode when no voltages are applied.

As is apparent from the above description, the polarizing control film of the present invention and the stereoscopic display device using the same can have the following effects.

First, polarization is controlled according to switching based on whether or not voltages are applied. Consequently, it is possible to switch between 2D display and 3D display based on whether or not voltages are applied.

Second, the polarizing control film is configured by coating the liquid crystal layer with a liquid type liquid crystal composite material and hardening the material using a lamination method. Consequently, an additional encapsulation member and a counter-board are not required and, therefore, the structure of the polarizing control film is simplified.

Third, the liquid crystal layer of the polarizing control film is constituted by nano liquid crystals. The size of the nano liquid crystals is very small. In a state in which the nano liquid crystals are randomly arranged when no voltages are applied, therefore, polarization of incident light is not caused with the result that optical isotropy is available. When voltages are applied, double refraction is generated to induce polarization.

Fourth, all layers of a general liquid crystal panel have mobility with the result that when the liquid crystal panel is bent due to external force, a cell gap is broken. In the polarizing control film of embodiments of the present invention, on the other hand, the nano liquid crystals used for the liquid crystal layer are contained in a plurality of capsules or nano liquid crystal groups such that the nano liquid crystals are differently arranged only in each capsule or liquid crystal groups. That is, the capsules or the nano liquid crystal groups are confined in a fixed binder or the binder is filled between the capsules or the nano liquid crystal groups to pack the capsules or the nano liquid crystal groups. Consequently, the thickness of the polarizing control film disposed on the film can be uniformly maintained due to solidity of the binder. That is, the cell gap is hardly changed with the result that, when external force is applied, the polarizing control film can easily return to the original state after being bent.

Fifth, the nano liquid crystals exhibit optical isotropy when no voltages are applied due to characteristics of the nano liquid crystals. An orientation film for guiding initial arrangement of the liquid crystals can be omitted as compared with a polarizing control structure of a conventional liquid crystal panel. As a result, definition of a rubbing direction is not required. Consequently, the structure of the polarizing control film is simplified and processing cost of the polarizing control film is reduced.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A stereoscopic display device comprising:
a display panel for displaying an image;
a polarizing control film comprising a plurality of first and second electrodes which are alternately arranged, and a liquid crystal layer covering the first and second electrodes and being filled with nano liquid crystals exhibiting optical isotropy when no voltages are applied to the first and second electrodes and exhibiting optical anisotropy when voltages are applied to the first and second electrodes; and
a polarizing lens film disposed on the polarizing control film, the polarizing lens film comprising an optically anisotropic lens layer and an optically isotropic planarization layer having a same one-axis refractive index as the optically anisotropic lens layer.

2. The stereoscopic display device according to claim 1, wherein the first and second electrodes of the polarizing control film are in direct contact with a surface of the polarizing lens film.

3. The stereoscopic display device according to claim 2, wherein the first and second electrodes are directly printed on the surface of the polarizing lens film.

4. The stereoscopic display device according to claim 3, wherein the liquid crystal layer comprises a plurality of liquid crystal groups having the nano liquid crystals and a binder, and the liquid crystal layer is laminated to the surface of the polarizing lens film in a film shape in which the liquid crystal groups are dispersed in the binder.

5. The stereoscopic display device according to claim 1, wherein the polarizing control film further comprises a substrate film contacting the polarizing lens film, and the first and second electrodes and the liquid crystal layer are located on the substrate film.

6. The stereoscopic display device according to claim 5, wherein the first and second electrodes are printed on a surface of the substrate film.

7. The stereoscopic display device according to claim 6, wherein the liquid crystal layer comprises a plurality of liquid crystal groups having the nano liquid crystals and a binder, and the liquid crystal layer is laminated to the surface of the substrate film in a film shape in which the liquid crystal groups are dispersed in the binder.

8. The stereoscopic display device according to claim 1, wherein a surface of the liquid crystal layer of the polarizing control film at which the first and second electrodes are not located is adhered to the display panel via an adhesion layer.

\* \* \* \* \*